United States Patent
Selvaraj et al.

(10) Patent No.: US 9,439,363 B1
(45) Date of Patent: Sep. 13, 2016

(54) BRACKET SYSTEM FOR GRAPPLE ASSEMBLY

(71) Applicant: Caterpillar Forest Products Inc., Peoria, IL (US)

(72) Inventors: Saravanakumar Selvaraj, Chennai (IN); William J. Ruff, Phillips, WI (US); Harikumar Chellaswamy, Chennai (IN)

(73) Assignee: Caterpillar Forest Products Inc., Peoria, IL (US)

( * ) Notice: Subject to any disclaimer, the term of this patent is extended or adjusted under 35 U.S.C. 154(b) by 0 days.

(21) Appl. No.: 14/696,518

(22) Filed: Apr. 27, 2015

(51) Int. Cl.
  *A01G 23/08* (2006.01)
  *A01G 23/095* (2006.01)
  *B66C 1/42* (2006.01)
  *F16M 13/02* (2006.01)

(52) U.S. Cl.
  CPC ............... *A01G 23/095* (2013.01); *B66C 1/42* (2013.01); *F16M 13/02* (2013.01)

(58) Field of Classification Search
  CPC ............. A01G 23/095; A01G 23/091; A01G 23/093; B66C 1/42; B66C 1/58; F16M 13/02; E02F 3/413
  USPC .......... 248/674, 220.21, 309.1; 144/336, 4.1, 144/34.1; 37/403, 406; 414/729, 732, 736, 414/738, 739; 294/81.2, 81.6
  See application file for complete search history.

(56) References Cited

U.S. PATENT DOCUMENTS

| | | | |
|---|---|---|---|
| 5,390,715 A | 2/1995 | Luscombe | |
| 6,266,901 B1 * | 7/2001 | Kanda | B66C 23/84 37/403 |
| 2006/0045717 A1 * | 3/2006 | Seymour | B66C 3/16 414/729 |
| 2007/0215247 A1 * | 9/2007 | Johnson | A01G 23/091 144/336 |
| 2012/0213937 A1 * | 8/2012 | LaValley | B26D 3/16 427/401 |
| 2013/0192098 A1 * | 8/2013 | Matsumoto | E02F 3/404 37/406 |
| 2014/0028042 A1 * | 1/2014 | LaValley | E21B 19/155 294/198 |
| 2014/0261890 A1 * | 9/2014 | Lindbom | A01G 23/08 144/336 |
| 2015/0292551 A1 * | 10/2015 | Hoffmans | A01G 23/006 403/83 |

FOREIGN PATENT DOCUMENTS

| | | |
|---|---|---|
| CA | 2650748 | 7/2010 |
| JP | 2009065840 | 4/2009 |
| WO | 02071833 | 9/2002 |

* cited by examiner

*Primary Examiner* — Todd M Epps (57) ABSTRACT

A bracket system for a grapple assembly of a machine is provided. The grapple assembly includes a grapple base having an elongate portion and a mounting portion extending from the elongate portion. The bracket system includes a lining member configured to contact at least a part of the elongate portion and to a first face of the mounting portion. The bracket system further includes a first plate disposed adjacent to a second face of the mounting portion and coupled to the lining member via a plurality of first fastening members. The bracket system further includes a second plate coupled to the first plate. The second plate is coupled with a grapple saw via a plurality of second fastening members. The first plate and the second plate define a space therebetween to facilitate coupling of the first and second plates with the mounting portion and the grapple saw, respectively.

20 Claims, 5 Drawing Sheets

BRACKET SYSTEM FOR GRAPPLE ASSEMBLY

TECHNICAL FIELD

The present disclosure relates to a detachable mounting system for a grapple saw, and more specifically relates to a bracket system associated with the mounting system, which facilitates easy assembly and disassembly of the grapple saw to a grapple assembly of a machine.

BACKGROUND

A grapple assembly is typically used in a machine for loading and/or for transporting various components, such as a log or a pipe component. The grapple assembly is attached to a boom structure of the machine. If the log is very long and difficult to load and/or to store in a space, then the log may be trimmed to make it into multiples pieces. Hence, a grapple saw is coupled to the grapple assembly to trim the log after loading the log in the grapple assembly. The grapple assembly includes a grapple base and a pair of grapple arms coupled to the grapple base. The grapple base is attached to the boom structure of the machine.

For coupling the grapple saw with the grapple assembly, the grapple base and/or the grapple arms may be dismantled from the boom structure. Further, a mounting structure of the grapple saw may be disposed between the grapple base and the boom structure to couple the grapple saw with the grapple assembly. This operation may lead to more time, and hence productivity of the machine may be reduced. Further, this operation may result into additional labor cost and operation cost due to need of special tools and labors having special skill set.

US Patent Publication Number 2006/0045717 (the '717 publication) discloses a retrofitted grapple saw and method for retrofitting hydraulic devices. The grapple saw includes a saw body and a saw disposed within the saw body. The saw body is bolted to a grapple body. The grapple body is coupled to a boom of a machine. According to the '717 publication, mounting holes for coupling the saw body may be defined in the grapple body. This may increase development cost of the grapple body as the mounting holes may be additionally designed and machined in the grapple body. Further, if the saw body has different mounting hole design, then the saw body may require modification to adapt to the mounting holes of the grapple body.

SUMMARY OF THE DISCLOSURE

In one aspect of the present disclosure, a bracket system for a grapple assembly of a machine is provided. The grapple assembly includes a grapple base rotatably coupled to a boom member of the machine and a plurality of grapple arms movably coupled to the grapple base. The grapple base includes at least one elongate portion and a mounting portion extending from the elongate portion. The mounting portion includes a first face facing the grapple arm and a second face opposite to the first face. The bracket system includes a lining member configured to contact at least a part of the elongate portion. The lining member is disposed adjacent to the first face of the mounting portion. The bracket system further includes a first plate configured to be disposed adjacent to the second face of the mounting portion. The first plate is detachably coupled to the lining member via a plurality of first fastening members. The bracket system further includes a second plate coupled to the first plate. The second plate is configured to detachably mount a grapple saw thereon via a plurality of second fastening members. The first plate and the second plate define a space therebetween configured to facilitate coupling of the first plate and the second plate with the mounting portion and the grapple saw via the plurality of first fastening members and the plurality of second fastening members, respectively.

In another aspect of the present disclosure, a bracket system for a grapple assembly of a machine is provided. The grapple assembly includes a grapple base rotatably coupled to a boom member of the machine and a plurality of grapple arms movably coupled to the grapple base. The grapple base includes a pair of elongate portions and a mounting portion extending from each of the pair of elongate portions. The mounting portion comprises a first face facing the grapple arm and a second face opposite to the first face. The bracket system includes a first lining member configured to contact at least a part of one of the pair of elongate portions. The first lining member is disposed adjacent to the first face of the mounting portion. The bracket system further includes a second lining member configured to contact at least a part of another of the pair of elongate portions. The second lining member is disposed adjacent to the first face of the mounting portion spaced apart from the first lining member. The bracket system further includes a first plate configured to be disposed adjacent to the second face of the mounting portion. The first plate is detachably coupled to the first lining member and the second lining member via a plurality of first fastening members. The bracket system further includes a second plate coupled to the first plate. The second plate is configured to detachably couple a grapple saw thereon via a plurality of second fastening members. The first plate and the second plate define a space therebetween configured to facilitate coupling of the first plate and the second plate with the mounting portion and the grapple saw via the plurality of first fastening members and the plurality of second fastening members, respectively.

In yet another aspect of the present disclosure, a method of detachably mounting a grapple saw on a grapple assembly of a machine is provided. The grapple assembly includes a grapple base rotatably coupled to a boom member of the machine and a plurality of the grapple arms movably coupled to the grapple base. The grapple base includes at least one elongate portion and a mounting portion extending from the elongate portion. The elongate portion includes a first face facing the grapple arm and a second face opposite to the first face. The method includes disposing a lining member on the elongate portion and adjacent to the first face of the mounting portion. The method further includes disposing a first plate adjacent to the second face of the mounting portion. The method further includes detachably coupling the first plate to the lining member via a first plurality of fastening members. The method further includes detachably coupling a grapple saw to a second plate via a plurality of second fastening members. The second plate is coupled to the first plate. The first plate and the second plate define a space therebetween to facilitate coupling of the first plate and the second plate with the mounting portion and the grapple saw, respectively.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
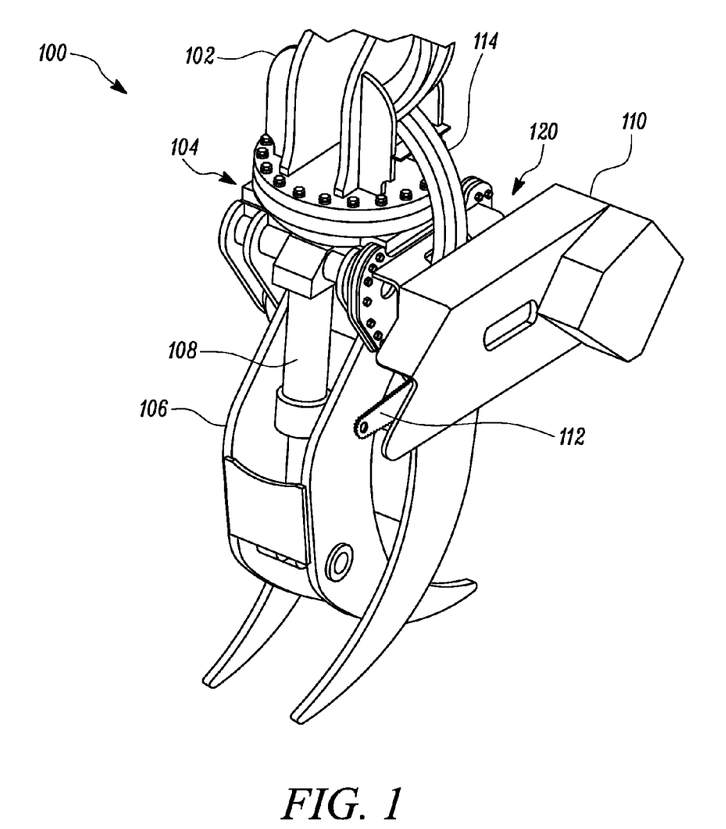
FIG. 1 is a perspective view of a grapple assembly including a grapple saw mounted thereon, according to an embodiment of the present disclosure.

FIG. 1 illustrates a perspective view of a grapple assembly 100 of a machine (not shown). The grapple assembly 100 includes a head assembly 102 configured to be coupled to a boom member (not shown) of the machine via a knuckle (not shown). The boom member may be coupled to a body of the machine. Further, the boom member may be actuated by a hydraulic system of the machine via one or more hydraulic cylinders to move the boom member relative to the body of the machine. The machine may be a track type machine or a wheel type machine having the boom member or a crane member to couple with the grapple assembly 100.

The grapple assembly 100 includes a grapple base 104 coupled to the head assembly 102 of the boom member. The head assembly 102 may be rotatable relative to the boom member based on actuation of the hydraulic system of the machine. In an example, a hydraulic motor may be operatively coupled to the head assembly 102, such that upon actuation of the hydraulic system, the hydraulic motor may rotate the head assembly 102 relative to the boom member.

The grapple assembly 100 further includes a plurality of grapple arms 106 movably coupled to the grapple base 104. The grapple arms 106 are configured to grapple various components including, but not limited to, a log and a pipe component for loading and transporting to various locations. In the embodiment of FIG. 1, the grapple assembly 100 includes a pair of grapple arms 106. The pair of grapple arms 106 is pivotally coupled to the grapple base 104. Further, each of the pair of grapple arms 106 is coupled to the grapple base 104 via a hydraulic actuator 108. The hydraulic actuators 108 may move between an extended position and a retracted position based on actuation of the hydraulic system. In the extended position of the hydraulic actuators 108, the grapple arms 106 move towards each other relative to the grapple base 104. In the retracted position of the hydraulic actuators 108, the grapple arms 106 move away from each other relative to the grapple base 104.

Referring to FIG. 1, a grapple saw 110 is coupled to the grapple assembly 100. The grapple saw 110 includes a saw member 112 configured to trim the log once the log is loaded in the grapple assembly 100. The grapple saw 110 may further include a hydraulic motor configured to actuate the saw member 112 based on actuation of the hydraulic system of the machine. The saw member 112 may further move relative to the grapple base 104 based on an input from an operator to trim the log loaded in the grapple assembly 100. The grapple saw 110 is coupled to the grapple base 104 via a bracket system 120, according to an embodiment of the present disclosure. The bracket system 120 is detachably coupled to the grapple base 104 when the grapple saw 110 is required for trimming the log loaded in the grapple assembly 100. After coupling the bracket system 120 to the grapple base 104, the grapple saw 110 is coupled to the bracket system 120. Further, the hydraulic motor of the grapple saw 110 may be fluidly coupled to the hydraulic system of the machine via a plurality of fluid lines 114.

Figure 2:
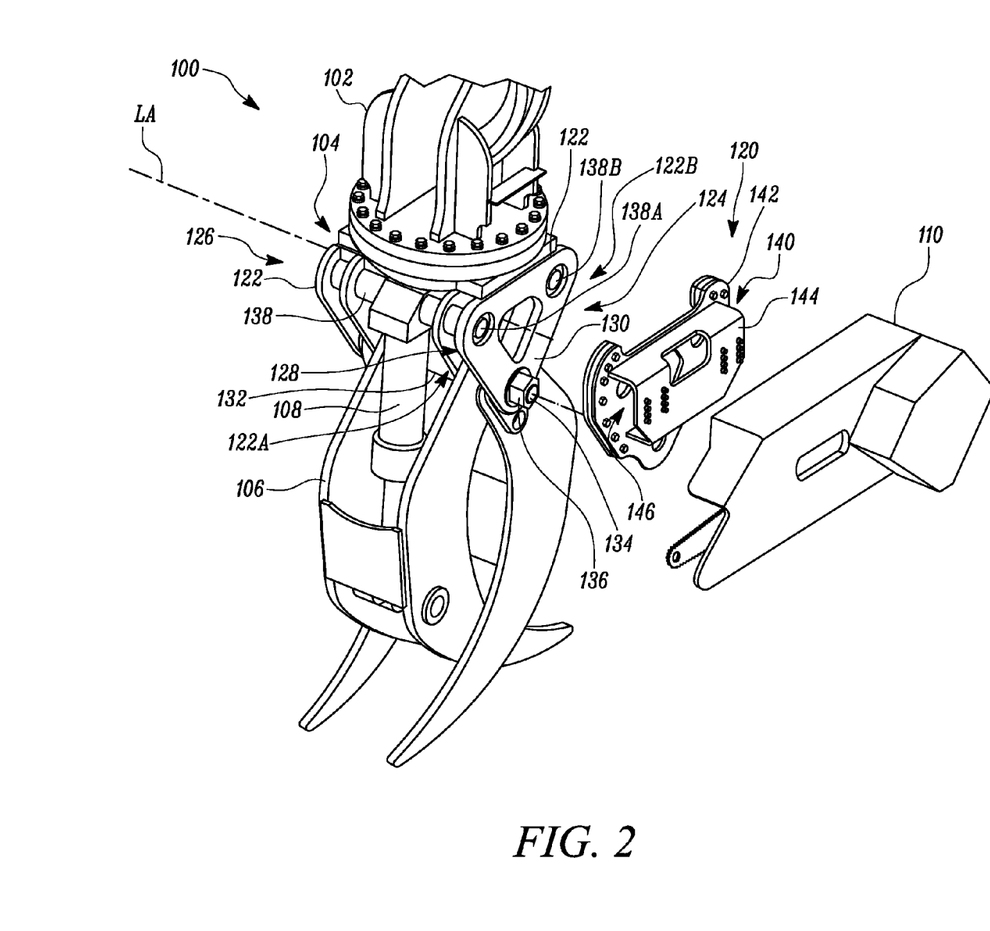
FIG. 2 is an exploded view showing a bracket system used for coupling the grapple saw with the grapple assembly, according to an embodiment of the present disclosure.

FIG. 2 is an exploded view showing coupling of the grapple saw 110 with the grapple assembly 100 via the bracket system 120, according to an embodiment of the present disclosure. In the embodiment of FIG. 2, the grapple base 104 includes a mounting portion 122 adjacent to a first side 124 thereof and a mounting portion 122 adjacent to a second side 126. The mounting portions 122 adjacent to the first and second sides 124, 126 are spaced apart from each other along a lateral axis LA. In an example, the mounting portions 122 may be made from a metal plate. Each of the mounting portions 122 includes a first face 128 facing the pair of grapple arms 106 and a second face 130 opposite to the first face 128. The first and second faces 128, 130 may define a thickness for the mounting portions 122. The grapple base 104 further includes a rod member 132 extending between the mounting portions 122 along a direction of the lateral axis LA. The rod member 132 is configured to pivotally couple the pair of grapple arms 106. The rod member 132 further includes a portion 134 extending beyond the second face 130 of the mounting portions 122 at the first side 124 of the grapple base 104. The portion 134 of the rod member 132 is engaged with a nut 136. An end of the rod member 132 at the second side 126 of the grapple base 104 and opposite to the portion 134 may have a plate welded thereto.

The grapple base 104 further includes a pair of elongate portions 138 extending between the mounting portions 122 along a direction of the lateral axis LA. The pair of elongate portions 138 is spaced apart from each other to pivotally couple the respective hydraulic actuators 108. Each of the hydraulic actuators 108 may move about the respective elongate portions 138 to move the respective grapple arms 106. As shown in FIG. 2, the grapple base 104 includes a first elongate portion 138A adjacent to a first side 122A of the mounting portions 122 and a second elongate portion 138B adjacent to a second side 122B of the mounting portions 122.

The bracket system 120 includes a bracket member 140 configured to be coupled to the second face 130 of one of the mounting portions 122. The bracket member 140 includes a first plate 142 configured to be disposed adjacent to the second face 130 of the mounting portion 122. The first plate 142 is detachably coupled to the grapple base 104. The bracket member 140 further includes a second plate 144 coupled to the first plate 142. The second plate 144 is configured to detachably couple the grapple saw 110. The first plate 142 and the second plate 144 are configured to define a space 146 therebetween. In the illustrated embodiment, the second plate 144 is welded to the first plate 142. In an alternative embodiment, the second plate 144 may be coupled to the first plate 142 via fastening members, such as bolts and nuts. In other embodiments, the second plate 144 may be coupled to the first plate 142 via any known method of coupling, such as snap fit coupling.

Figure 3:
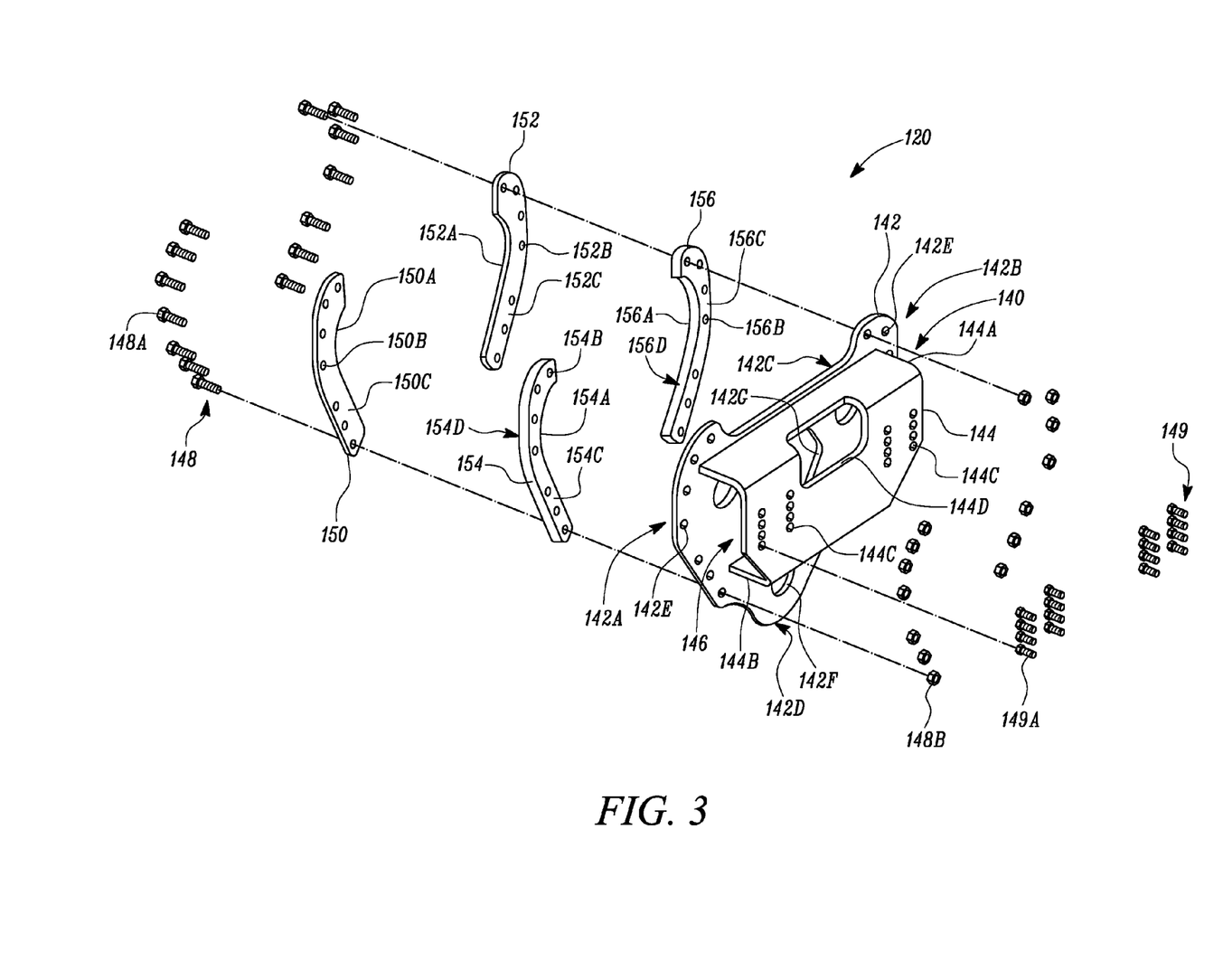
FIG. 3 is an exploded view of the bracket system, according to an embodiment of the present disclosure.

FIG. 3 is an exploded view of the bracket system 120, according to an embodiment of the present disclosure. The bracket system 120 includes a plurality of first fastening members 148 configured to detachably couple the bracket member 140 with the grapple base 104 of the grapple assembly 100. Further, the bracket system 120 includes a plurality of second fastening members 149 configured to detachably couple the grapple saw 110 with the bracket member 140.

The first plate 142 of the bracket member 140 includes a first side 142A and a second side 142B distal to the first side 142A. The first plate 142 may define a length between the first and second sides 142A, 142B. The length of the first plate 142 may be greater than a length defined by the mounting portion 122 between the first and second sides 122A, 122B thereof. The first plate 142 further includes a first surface 142C configured to at least partially abut the second face 130 of the mounting portion 122 and a second surface 142D distal to the first surface 142C. The first and second surfaces 142C, 142D may define a thickness for the first plate 142. The first plate 142 further includes a set of first holes 142E defined adjacent to the first side 142A thereof. The set of first holes 142E is configured to receive the plurality of first fastening members 148 therethrough. Further, a set of first holes 142E is defined adjacent to the second side 142B of the first plate 142 to receive the plurality of first fastening members 148 therethrough. The first plate 142 further includes a cutout 142G configured to receive the plurality of fluid lines 114 therethrough. In an embodiment, one or more first holes 142E may be further defined around a center portion (not shown) of the first plate 142. In the illustrated embodiment, each of the plurality of first fastening members 148 includes a bolt 148A and a nut 148B for engaging with the bolt 148A. In other embodiments, the first fastening member 148 may be a stud or any other fastening member known in the art. The first plate 142 further includes an aperture 142F configured to receive the portion 134 of the rod member 132 therethrough.

The second plate 144 includes a first leg portion 144A and a second leg portion 144B configured to couple with the second surface 142D of the first plate 142. Thus, the space 146 is defined between the second surface 142D of the first plate 142 and the second plate 144. The second plate 144 further includes a set of second holes 144C configured to receive the plurality of second fastening members 149 therethrough. In the illustrated embodiment, each of the plurality of second fastening members 149 includes a bolt 149A and a nut (not shown) for engaging with the bolt 149A. In other embodiments, the second fastening member 149 may be a stud or any other fastening members known in the art. The set of second holes 144C may be defined in the second plate 144 based on a plurality of mounting holes (not shown) defined in the grapple saw 110. In various embodiments, the second plate 144 may be adapted to mount grapple saw having various mounting specification. Thus, the space 146 is configured to facilitate coupling of the first plate 142 and the second plate 144 with the mounting portion 122 and the grapple saw 110 via the plurality of first fastening members 148 and the plurality of second fastening members 149, respectively. The second plate 144 further includes a cutout 144D configured to receive the plurality of fluid lines 114 therethrough.

The bracket system 120 further includes a lining member 150 configured to contact at least a part of the pair of elongate portions 138 of the grapple base 104. The lining member 150 is further configured to be disposed adjacent to the first face 128 of the mounting portion 122. The lining member 150 is hereinafter referred as 'the first lining member 150'. In the illustrated embodiment, the bracket system 120 includes the first lining member 150 and a second lining member 152. The first lining member 150 includes an inner circumference 150A configured to at least partially contact with a part of the first elongate portion 138A. The first lining member 150 further includes a set of holes 150B corresponding to the set of first holes 142E defined adjacent to the first side 142A of the first plate 142. The set of holes 150B are adapted to align with the set of first holes 142E of the first plate 142. The set of holes 150B is further configured to receive the bolts 148A therethrough. The first lining member 150 further includes a surface 150C adapted to at least partially engage with the first face 128 of the first side 122A of the mounting portion 122. In an embodiment, the first lining member 150 further may include an arm (not shown) defining one or more holes.

Similarly, the second lining member 152 includes an inner circumference 152A configured to at least partially contact with a part of the second elongate portion 138B and a set of holes 152B corresponding to the set of first holes 142E defined adjacent to the second side 142B of the first plate 142. The set of holes 152B is configured to receive the bolts 148A therethrough. The second lining member 152 further includes a surface 152C adapted to at least partially engage with the first face 128 of the second side 122B of the mounting portion 122. In an embodiment, the second lining member 152 may further include an arm (not shown) defining one or more holes. In an example, the first and second lining members 150, 152 may be made from a metal or an alloy. In another example, the first and second lining members 150, 152 may be made from a plastic or any other material known in the art.

The bracket system 120 further includes a first spacer member 154 configured to be disposed between the first lining member 150 and the first plate 142 adjacent to the first side 122A of the mounting portion 122. The first spacer member 154 includes an inner circumference 154A complementary to an outer circumference 122C (shown in FIG. 4) defined by the first side 122A of the mounting portion 122. The inner circumference 154A of the first spacer member 154 is configured to at least partially contact with the outer circumference 122C of the mounting portion 122. The first spacer member 154 further includes a set of holes 154B corresponding to the set of first holes 142E and the set of holes 150B of the first plate 142 and the first lining member 150, respectively. The set of holes 154B is adapted to align with the set of first holes 142E and the set of holes 150B of the first plate 142 and the first lining member 150, respectively. The set of holes 154B is further configured to receive the bolts 148A therethrough. The first spacer member 154 further includes a first surface 154C adapted to at least partially engage with the first surface 142C adjacent to the first side 142A of the first plate 142. The first spacer member 154 further includes a second surface 154D adapted to at least partially engage with the surface 150C of the first lining member 150. The first and second surfaces 154C, 154D may define a thickness for the first spacer member 154, which may be equal or less than the thickness of the first plate 142. Thus, the first spacer member 154 is configured to be disposed between the first plate 142 and the first lining member 150.

Similarly, the bracket system 120 includes a second spacer member 156 configured to be disposed between the second lining member 152 and the first plate 142 adjacent to the second side 122B of the mounting portion 122. The second spacer member 156 includes an inner circumference 156A configured to at least partially contact with an outer circumference 122D (shown in FIG. 4) defined by the second side 122B of the mounting portion 122. The second spacer member 156 further includes a set of holes 156B adapted to align with the set of first holes 142E and the set of holes 152B of the first plate 142 and the second lining member 152, respectively. The set of holes 156B is further configured to receive the plurality of bolts 148A therethrough. The second spacer member 156 further includes a first surface 156C adapted to at least partially engage with the first surface 142C adjacent to the second side 142B of the first plate 142. The second spacer member 156 further includes a second surface 156D adapted to at least partially engage with the surface 152C of the second lining member 152. The first and second surfaces 156C, 156D may define the thickness for the second spacer member 156, which may be equal or less than the thickness of the first plate 142. Thus, the second spacer member 156 is configured to be disposed between the first plate 142 and the second lining member 152.

Figure 4:
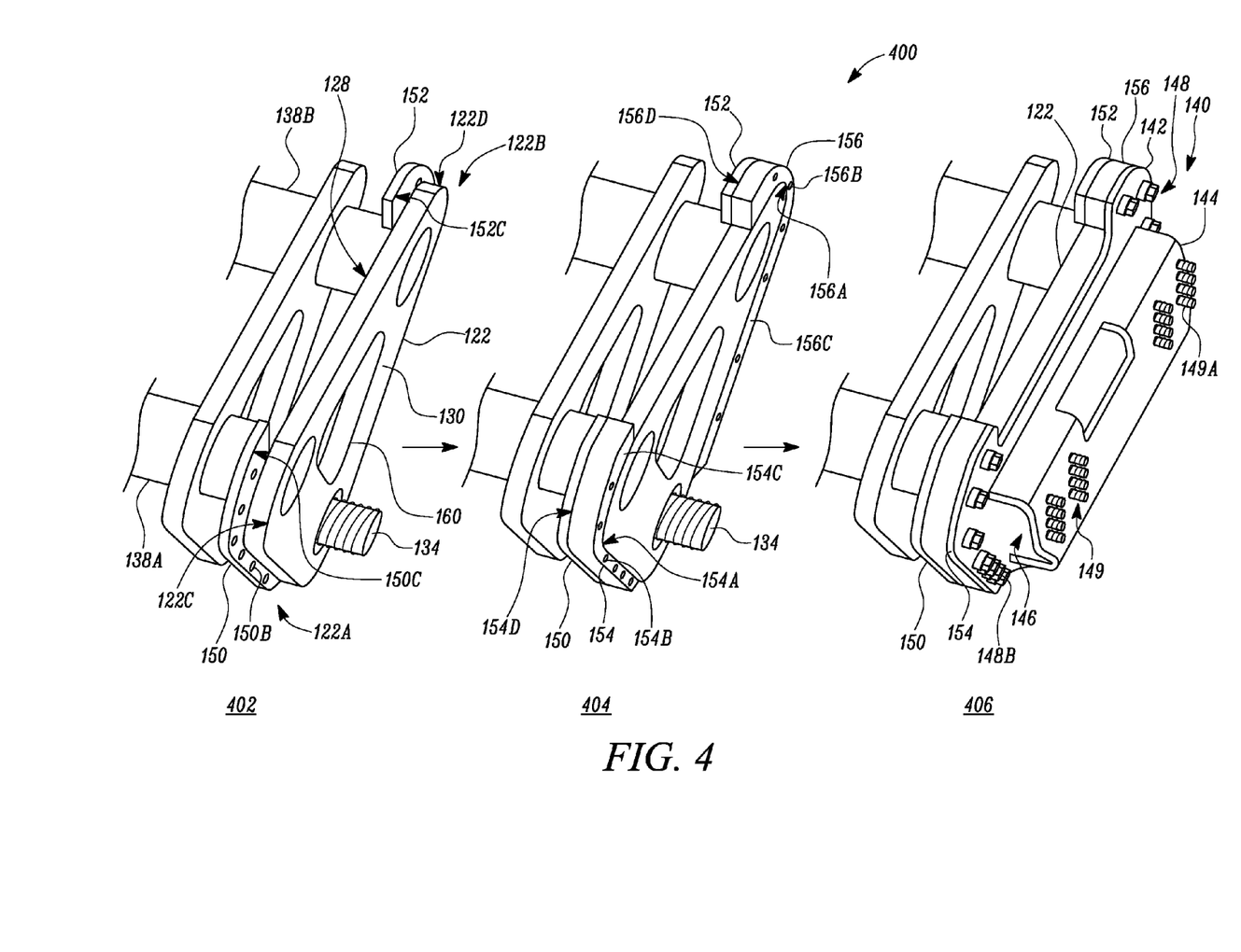
FIG. 4 shows a method of coupling the bracket system with a grapple base of the grapple assembly, according to an embodiment of the present disclosure.

FIG. 4 shows a method of coupling the bracket system 120 with the grapple base 104, according to an embodiment of the present disclosure. At step 402, the first lining member 150 is disposed adjacent to the first side 122A of the mounting portion 122. Further, the first lining member 150 may be aligned to contact the inner circumference 150A thereof with the first elongate portion 138A. The first lining member 150 is further aligned to partially contact the surface 150C thereof with the first face 128 of the mounting portion 122. Further, the first lining member 150 is disposed relative to the mounting portion 122 to align the set of holes 150B thereof with the set of first holes 142E of the first plate 142. Similarly, the second lining member 152 is disposed adjacent to the second side 122B of the mounting portion 122 to contact the inner circumference 152A thereof with the second elongate portion 138B and to contact the surface 152C thereof with the first face 128 of the mounting portion 122. Further, the second lining member 152 is disposed relative to the mounting portion 122 to align the set of holes 152B thereof with the set of first holes 142E of the first plate 142.

At step 404, the first spacer member 154 is disposed adjacent to the first lining member 150 such that the second surface 154D of the first spacer member 154 contacts with the surface 150C of the first lining member 150. The inner circumference 154A of the first spacer member 154 is aligned to contact with the outer circumference 122C of the mounting portion 122. Further, the set of holes 154B of the first spacer member 154 is aligned with the set of holes 150B of the first lining member 150 to receive the bolts 148A therethrough. Similarly, the second spacer member 156 is disposed adjacent to the second lining member 152 such that the second surface 156D of the second spacer member 156 contacts with the surface 152C of the second lining member 152. The inner circumference 156A of the second spacer member 156 is aligned to contact with the outer circumference 122D of the mounting portion 122. Further, the set of holes 156B of the second spacer member 156 is aligned with the set of holes 152B of the second lining member 152 to receive the bolts 148A therethrough.

At step 406, the bracket member 140 is disposed adjacent to the second face 130 of the mounting portion 122 such that the first surface 142C of the first plate 142 contacts with the second face 130 of the mounting portion 122. The portion 134 of the rod member 132 is received through the aperture 142F of the first plate 142. Further, the first surface 142C of the first plate 142 contacts with the first surfaces 154C and 156C of the first and second spacer members 154, 156, respectively. The set of first holes 142E defined adjacent to the first side 142A of the first plate 142 is further aligned with the set of holes 154B and 150B of the first spacer member 154 and the first lining member 150, respectively. Similarly, the set of first holes 142E defined adjacent to the second side 142B of the first plate 142 is further aligned with the set of holes 156B and 152B of the second spacer member 156 and the second lining member 152, respectively. Further, a set of bolts 148A is inserted through the set of hoes 154B, 150B, the set of first holes 142E of the first spacer member 154, the first lining member 150 and the first plate 142, respectively to engage with a set of nuts 148B. Similarly, a set of bolts 148A is inserted through the set of hoes 156B, 152B, the set of first holes 142E of the second spacer member 156, the second lining member 152 and the first plate 142, respectively to engage with a set of nuts 148B. Further, the portion 134 of the rod member 132 is engaged with the nut 136. Thus, the bracket system 120 is rigidly coupled with the mounting portion 122 of the grapple base 104. The grapple saw 110 may be further coupled to the second plate 144 of the bracket member 140 via the plurality of second fastening members 149.

In an embodiment, a coupling member (not shown) may be configured to be coupled with the first and second lining members 150, 152 via one or more first fastening members 148. The coupling member may be disposed within a cutout 160 defined in the mounting portion 122. The cutout 160 is extending between the first face 128 and the second face 130 of the mounting portion 122 to receive the coupling member therethrough. The coupling member may include a set of holes corresponding to the one or more holes defined in the arms of the first and second lining members 150, 152, respectively. The coupling member may be disposed within the cutout 160 to align the set of holes thereof with the one or more holes of the arms of the first and the second lining members 150, 152, respectively. Further, one or more bolts 148A may be inserted through the set of holes of the arms of the first and second lining members 150, 152, the coupling member and the first plate 142, respectively. Thus, the first plate 142 may be coupled to the first and second lining member 150, 152 via the coupling member.

INDUSTRIAL APPLICABILITY

The present disclosure relates to the bracket system 120 and a method 600 of coupling the grapple saw 110 with the grapple assembly 100. The grapple saw 110 is directly coupled to grapple assembly 100 via the bracket system 120 without disturbing or modifying the grapple assembly 100 of the machine.

Figure 5:
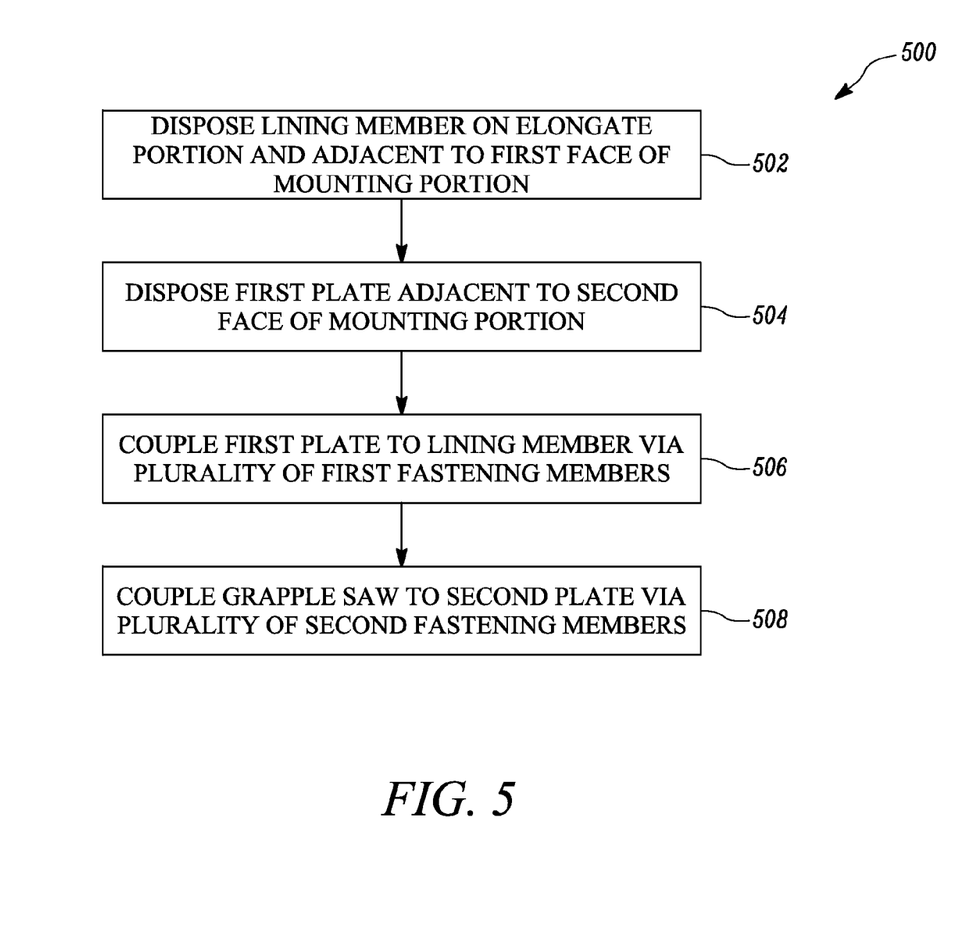
FIG. 5 is a flowchart of a method of coupling the grapple saw with the grapple assembly, according to an embodiment of the present disclosure.

FIG. 5 is a flow chart of a method 500 of coupling the grapple saw 110 with the grapple assembly 100, according to an embodiment of the present disclosure. At step 502, the method 500 includes disposing the first and the second lining members 150, 152 on the first and second elongate portions 138A, 138B such that the inner circumferences 150A, 152A of the first and second lining members 150, 152 contacts with at least the part of the first and second elongate portions 138A, 138B, respectively. Further, the first and second lining members 150, 152 are disposed adjacent to the first face 128 of the mounting portion 122 such that the surfaces 150C, 152C of the first and the second lining members 150, 152 contact with the first face 128 of the mounting portion 122. Further, the first and second lining members 150, 152 are disposed relative to the mounting portion 122 to align the set of holes 150B, 152B thereof, respectively, with the set of first holes 142E of the first plate 142.

In an embodiment, the method 500 further includes disposing the first and second spacer members 154, 156 adjacent to the first and second lining members 150, 152 such that the second surfaces 154D, 156D of the first and second spacer members 154, 156 contact with the surfaces 150C, 152C of the first and second lining members 150, 152, respectively. Further, the set of holes 154B, 156B of the first and second spacer members 154, 156 are aligned with the set of holes 150B, 152B of the first and second lining members 150, 152, respectively, to receive the plurality of first fastening members 148 therethrough. In another embodiment, the coupling member may be disposed within the cutout 160 to couple the first plate 142 with the arms of the first and second lining members 150, 152, respectively.

At step 504, the method 500 includes disposing the first plate 142 of the bracket member 140 adjacent to the second face 130 of the mounting portion 122. The portion 134 of the rod member 132 is received through the aperture 142F of the first plate 142. The first plate 142 is disposed adjacent to the second face 130 of the mounting portion 122 such that the first surface 142C of the first plate 142 contacts with the second faces 130, 154D, 156D of the mounting portion 122, the first spacer member 154 and the second spacer member 156, respectively.

At step 506, the method 500 includes coupling the first plate 142 to the first and second lining members 150, 152 via the plurality of first fastening members 148. The set of bolts 148A is inserted through the set of holes 150B, 154B and the set of first holes 142E of the first lining member 150, the first spacer member 154 and the first plate 142, respectively. Further, another set of bolts 148A is inserted through the set of holes 152B, 156B and the set of first holes 142E of the second lining member 152, the second spacer member 156 and the first plate 142, respectively. The set of nuts 148B are engaged with the set of bolts 148A to detachably couple the first plate 142 with the first and second lining members 150, 152. Further, the portion 134 of the rod member 132 received through the aperture 142F is engaged with the nut 136. In another embodiment, one or more bolts 148A may be used for coupling the first plate 142 with the first and second lining members 150, 152 via the coupling member.

At step 508, the method 500 includes detachably coupling the grapple saw 110 to the second plate 144 via the plurality of second fastening members 149. The mounting holes of the grapple saw 110 may be aligned with the set of second holes 144C of the second plate 144. The plurality of second fastening members 149 is inserted through the set of second holes 144C and the mounting holes of the second plate 144 and the grapple saw 110, respectively, and engaged with the plurality of nuts. The space 146 defined between the first plate 142 and the second plate 144 facilitates coupling of the first plate 142 and the second plate 144 with the mounting portion 122 and the grapple saw 110, respectively.

With the bracket system 120 of the present disclosure, the grapple saw 110 may be directly coupled to the grapple base 104 without dismantling the grapple assembly 100 from the boom member. Further, the first and second lining members 150, 152 and the first and second spacer members 154, 156 may facilitate coupling of the grapple saw 110 with the grapple assembly 100 without requiring any special tools. Further, productivity of the machine may be improved as less time is required to couple the grapple saw 110 with the grapple assembly 100 compare to the existing coupling method.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A bracket system for a grapple assembly of a machine, the grapple assembly comprising a grapple base rotatably coupled to a boom member of the machine and a plurality of grapple arms movably coupled to the grapple base, the grapple base comprising at least one elongate portion and a mounting portion extending from the elongate portion, the mounting portion comprises a first face facing the grapple arm and a second face opposite to the first face, the bracket system comprising:
a lining member configured to contact at least a part of the elongate portion, wherein the lining member is disposed adjacent to the first face of the mounting portion;
a first plate configured to be disposed adjacent to the second face of the mounting portion, wherein the first plate is detachably coupled to the lining member;
a plurality of first fastening members configured to detachably couple the first plate to the lining member;
a second plate coupled to the first plate, the second plate configured to detachably mount a grapple saw thereon; and
a plurality of second fastening members configured to detachably couple the grapple saw to the second plate;
wherein the first plate and the second plate define a space therebetween, and wherein the space is configured to facilitate coupling of the first plate and the second plate with the mounting portion and the grapple saw via the plurality of first fastening members and the plurality of second fastening members, respectively.

2. The bracket system of claim 1, wherein the first plate comprises a set of first holes configured to receive the plurality of first fastening members therethrough.

3. The bracket system of claim 1, wherein the lining member comprises a set of holes adapted to align with the set of first holes of the first plate, wherein the set of holes is configured to receive the plurality of first fastening members therethrough.

4. The bracket system of claim 3 further comprising a first spacer member disposed between the lining member and the first plate adjacent to the mounting portion, wherein the first spacer member comprises a set of holes configured to align with the set of first holes of the first plate and the set of holes of the lining member to receive the plurality of first fastening members therethrough.

5. The bracket system of claim 1 further comprising a second lining member configured to contact at least a part of another elongate portion, the second lining member disposed adjacent to the first face of the mounting portion and spaced apart from the lining member, wherein the first plate is detachably coupled to the second lining member via the plurality of first fastening members.

6. The bracket system of claim 5 further comprising a second spacer member disposed between the second lining member and the first plate adjacent to the mounting portion, wherein the second spacer member comprises a set of holes configured to receive the plurality of first fastening members therethrough.

7. The bracket system of claim 1, wherein the first plate defines an aperture configured to receive at least a portion of a rod member of the grapple base, wherein the rod member is configured to movably couple the plurality of grapple arms relative to the grapple base.

8. The bracket system of claim 7 further comprising a nut configured to engage with the portion of the rod member, wherein the nut is further configured to detachably couple the first plate with the grapple base.

9. The bracket system of claim 1, wherein each of the first and second plates comprises a cutout configured to receive a plurality of fluid lines therethrough, and wherein the fluid lines are configured to fluidly communicate the grapple saw with the machine.

10. The bracket system of claim 1, wherein the second plate comprises a set of second holes configured to receive the plurality of second fastening members therethrough.

11. A bracket system for a grapple assembly of a machine, the grapple assembly comprising a grapple base rotatably coupled to a boom member of the machine and a plurality of grapple arms movably coupled to the grapple base, the grapple base comprising a pair of elongate portions and a mounting portion extending from each of the pair of elongate portions, the mounting portion comprises a first face facing the grapple arm and a second face opposite to the first face, the bracket system comprising:
  a first lining member configured to contact at least a part of one of the pair of elongate portions, wherein the first lining member is disposed adjacent to the first face of the mounting portion;
  a second lining member configured to contact at least a part of another of the pair of elongate portions, the second lining member disposed adjacent to the first face of the mounting portion spaced apart from the first lining member;
  a first plate configured to be disposed adjacent to the second face of the mounting portion, wherein the first plate is detachably coupled to the first lining member and the second lining member;
  a plurality of first fastening members configured to detachably couple the first plate to the first and second lining members;
  a second plate coupled to the first plate, the second plate configured to detachably mount a grapple saw thereon; and
  a plurality of second fastening members configured to detachably couple the grapple saw to the second plate;
  wherein the first plate and the second plate define a space therebetween, and wherein the space is configured to facilitate coupling of the first plate and the second plate with the mounting portion and the grapple saw via the plurality of first fastening members and the plurality of second fastening members, respectively.

12. The bracket system of claim 11, wherein the first plate comprises a set of first holes configured to receive the plurality of first fastening members therethrough.

13. The bracket system of claim 11, wherein the first lining member and the second lining member comprises a set of holes adapted to align with the set of first holes of the first plate, and wherein the set of holes of the first and second lining members are configured to receive the plurality of first fastening members therethrough.

14. The bracket system of claim 13 further comprising a first spacer member disposed between the first lining member and the first plate adjacent to the mounting portion, wherein the first spacer member comprises a set of holes configured to align with the set of first holes of the first plate and the set of holes of the first lining member to receive the plurality of first fastening members.

15. The bracket system of claim 13 further comprising a second spacer member disposed between the second lining member and the first plate adjacent to the mounting portion, wherein the second spacer member comprises a set of holes configured to align with the set of first holes of the first plate and the set of holes of the second lining member receive the plurality of first fastening members.

16. The bracket system of claim 11, wherein the first plate defines an aperture configured to receive at least a portion of a rod member of the grapple base, wherein the rod member is configured to movably couple the plurality of grapple arms relative to the grapple base.

17. The bracket system of claim 16, further comprising a nut configured to engage with the portion of the rod member, wherein the nut is further configured to detachably couple the first plate with the grapple base.

18. The bracket system of claim 11, wherein the second plate comprises a set of second holes configured to receive the plurality of second fastening members therethrough.

19. A method of detachably coupling a grapple saw on a grapple assembly of a machine, the grapple assembly comprising a grapple base rotatably coupled to a boom member of the machine and a plurality of the grapple arms movably coupled to the grapple base, the grapple base comprising at least one elongate portion and a mounting portion extending from the elongate portion, the elongate portion comprises a first face facing the grapple arm and a second face opposite to the first face, the method comprising:
  disposing a lining member on the elongate portion and adjacent to the first face of the mounting portion;
  disposing a first plate adjacent to the second face of the mounting portion;
  detachably coupling, via a plurality of first fastening members, the first plate to the lining member; and
  detachably coupling, via a plurality of second fastening members, a grapple saw to a second plate, wherein the second plate is coupled to the first plate, and wherein the first plate and the second plate define a space therebetween to facilitate coupling of the first plate and the second plate with the mounting portion and the grapple saw, respectively.

20. The method of claim 19 further comprising disposing a spacer member between the lining member and the first plate, the spacer member comprises a set of holes configured to receive the plurality of second fastening members therethrough.

* * * * *